(No Model.)
R. & S. POLLARD.
PLUMB LEVEL.
No. 526,458. Patented Sept. 25, 1894.
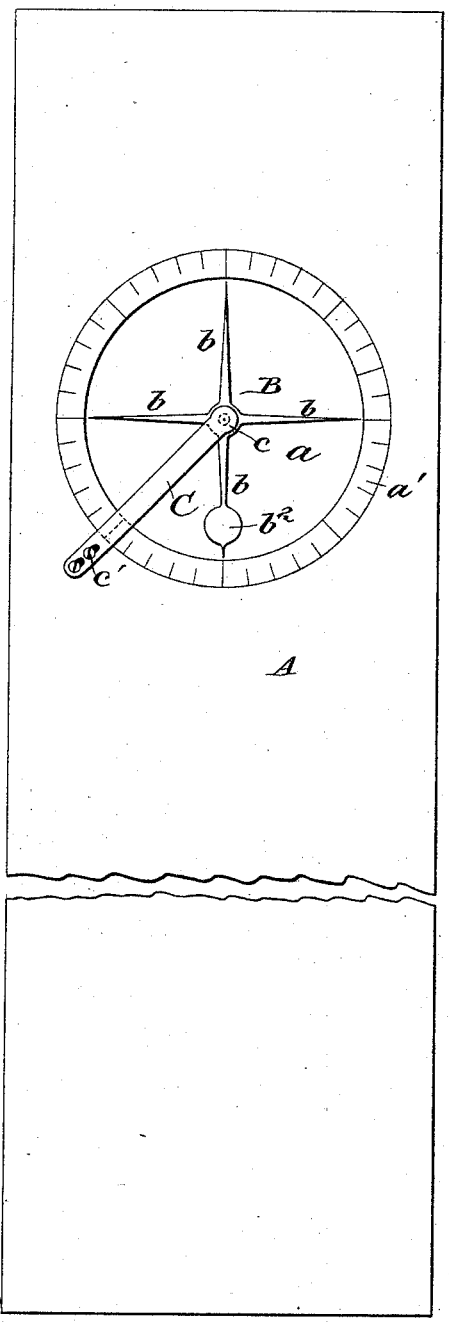
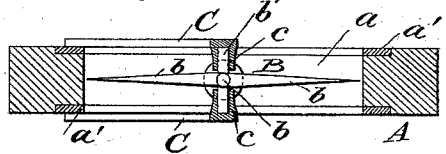
Witnesses:
J. W. Coleman
H. J. Hayden
Inventors
Robert Pollard
Six Pollard
by S. C. Fitzgerald
Atty.

UNITED STATES PATENT OFFICE.

ROBERT POLLARD AND SIX POLLARD, OF HALLSVILLE, MISSOURI.

PLUMB-LEVEL.

SPECIFICATION forming part of Letters Patent No. 526,458, dated September 25, 1894.

Application filed March 22, 1894. Serial No. 504,602. (No model.)

*To all whom it may concern:*

Be it known that we, ROBERT POLLARD and SIX POLLARD, citizens of the United States, residing at Hallsville, in the county of Boone and State of Missouri, have invented certain new and useful Improvements in Metallic Levels; and we do hereby declare the following to be a full, clear, and exact description of the invention, such as will enable others skilled in the art to which it appertains to make and use the same.

Our invention relates to improvements in levels or plumbs, and especially to "metallic" levels.

The invention will first be described in connection with the accompanying drawings, and then particularly pointed out in the claim.

In the drawings—Figure 1 is a side elevation of a device embodying our invention. Fig. 2 is a cross-section of the same, taken through the central pivot pin.

Referring to the drawings, A is a level-body which is provided with a central circular opening $a$ near one end and with a graduated annular scale $a'$ surrounding the opening, this scale being graduated in degrees entirely around the scale. If desired two of these scales may be employed, one on each side of the level-body.

A multiplex pointer B preferably comprising four arms $b$ is fixed on a pivot-pin $b'$ which is held in sockets $c$ carried at the center of the circular opening $a$ by a pair of standards C attached to the level-body A by screws $c'$. One of the four arms is provided with a weight, $b^2$, which may be either integral therewith or attached thereto by suitable means.

When the level-body is placed with its longer sides vertical, the weighted arm of the pointer will be at the zero graduation of the scale or scales, and as the level-body is inclined the pointer will swing around and thus indicate the degrees of inclination of the level-body.

By means of the four arms on the multiplex pointer four readings of the scale may be taken and the errors of graduation compensated by taking the mean of the four readings. However, when the weighted arm hangs in such a position that its arm is hidden by the standards, only three readings can be taken.

As there is a scale on both sides of the level-body a double set of readings may be taken, so that by repetitions of readings at various positions of the pointer, entirely around the scale, the instrumental errors in graduation or eccentricity of the pivot-pin may be determined so as to enable the coefficient of error of the instrument to be obtained, after which careful measurements may be made which are then reduced by applying the proper corrections, thus giving a very near approach to absolute accuracy.

The standards may be attached to the level-body in such a way as to be capable of adjustment to correct the inaccuracies due to the eccentricity of the pivot-pin. For example, the screws which hold the standards to the body A, may pass through slots in the ends of the standards, whereby, by loosening the said screws, the standards may be moved to or from the center of the circular opening.

We are aware that it is old to provide a level with a weighted pointer and an adjusting screw. We are also aware that it is old to provide a level with a two faced dial, and these features we do not broadly claim, but What we do claim as new, and desire to secure by Letters Patent, is—

In a level, the combination with a level body having a circular opening and provided with graduated scales around the opening on both sides of the body, of a pair of standards adjustably secured to the level body, and each provided at one end with a socket formed on its inner face, and near its outer end with elongated slots, for purposes of adjustment, the weighted pointer having bearings to engage the sockets in the standards, said pointer being supported in the opening in the level body in proximity to and between the graduated scales, all substantially as described and shown.

In testimony whereof we affix our signatures in presence of two witnesses.

ROBERT POLLARD,
SIX POLLARD.

Witnesses:
J. W. HULEN,
R. F. HULEN.